US010826773B2

(12) United States Patent
Labonté et al.

(10) Patent No.: US 10,826,773 B2
(45) Date of Patent: Nov. 3, 2020

(54) METHOD AND SYSTEM FOR SIDELINING OF A NETWORK DEVICE

(71) Applicant: Arista Networks, Inc., Santa Clara, CA (US)

(72) Inventors: François Labonté, Menlo Park, CA (US); Kenneth James Duda, Santa Clara, CA (US); Hugh W. Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 98 days.

(21) Appl. No.: 16/363,137

(22) Filed: Mar. 25, 2019

(65) Prior Publication Data

US 2020/0106640 A1 Apr. 2, 2020

Related U.S. Application Data

(60) Provisional application No. 62/739,582, filed on Oct. 1, 2018.

(51) Int. Cl.
*H04L 12/24* (2006.01)
*H04L 12/417* (2006.01)
*H04L 12/26* (2006.01)

(52) U.S. Cl.
CPC ........ *H04L 41/0893* (2013.01); *H04L 12/417* (2013.01); *H04L 41/12* (2013.01); *H04L 41/046* (2013.01); *H04L 43/0817* (2013.01); *H04L 43/0829* (2013.01); *H04L 43/16* (2013.01)

(58) Field of Classification Search
CPC ............ H04L 41/0893; H04L 43/0817; H04L 43/0829; H04L 12/417; H04L 41/12; H04L 41/046; H04L 43/16
See application file for complete search history.

(56) References Cited

U.S. PATENT DOCUMENTS

2004/0215577 A1* 10/2004 Mitsuda ............. G06Q 30/0283
705/77
2017/0147049 A1* 5/2017 Andre ...................... G06F 1/206
2018/0124585 A1* 5/2018 Rajagopalan ........... H04L 67/42
2019/0215240 A1* 7/2019 Li .......................... G06Q 10/20

* cited by examiner

*Primary Examiner* — Paul H Masur
(74) *Attorney, Agent, or Firm* — Chamberlain, Hrdlicka, White, Williams & Aughtry

(57) ABSTRACT

Embodiments of the invention may relate to methods, systems, and/or non-transitory computer readable mediums for sidelining Such sidelining may include making a first determination, by a first network device, that a first network device state has degraded and making a first request, based on the first determination, to receive a first sideline token from a network controller. The network controller, in response to the first request, may make a second determination that a remaining sideline token is available. The method may also include receiving, by the first network device and based on the second determination, the remaining sideline token from the network controller and initiating, by the first network device, a graceful offlining based on receiving the remaining sideline token.

22 Claims, 3 Drawing Sheets

METHOD AND SYSTEM FOR SIDELINING OF A NETWORK DEVICE

CROSS REFERENCE TO RELATED APPLICATIONS

This patent application claims the benefit of U.S. Provisional Patent Application Ser. No. 62/739,582 filed on Oct. 1, 2018 under 35 U.S.C. § 119(e). U.S. Provisional Patent Application Ser. No. 62/739,582 is incorporated herein by reference in its entirety.

BACKGROUND

Networks of interconnected devices often include any number of network devices (e.g., switches, routers, etc.). Such network devices may be arranged in a network topology in order to provide connectivity between devices within and outside of the network. On occasion, a given network device will experience a problem, such the network device dropping packets. Such a network device may require being removed from service until the problem can be resolved.

SUMMARY

In general, in one aspect, embodiments of the invention relate to a method for sidelining. The method may include making a first determination, by a first network device, that a first network device state has degraded and making a first request, based on the first determination, to receive a first sideline token from a network controller. The network controller, in response to the first request, may make a second determination that a remaining sideline token is available. The method may also include receiving, by the first network device and based on the second determination, the remaining sideline token from the network controller and initiating, by the first network device, a graceful offlining based on receiving the remaining sideline token.

In general, in one aspect, embodiments of the invention relate to a non-transitory computer readable medium including instructions that, when executed by a processor, perform a method for sidelining. The method may include making a first determination, by a first network device, that a first network device state has degraded and making a first request, based on the first determination, to receive a first sideline token from a network controller. The network controller, in response to the first request, may make a second determination that a remaining sideline token is available. The method may also include receiving, by the first network device and based on the second determination, the remaining sideline token from the network controller and initiating, by the first network device, a graceful offlining based on receiving the remaining sideline token.

In general, in one aspect, embodiments of the invention relate to a system for sidelining. The system may include a network device with a first processor, a first memory, and a first storage device, and be configured to make a first determination that a first network device state has degraded; make a request, based on the first determination, to receive a first sideline token from a network controller; receive a remaining sideline token from the network controller; and initiate a graceful offlining based on receiving the remaining sideline token. The system may also include the network controller with a second processor, a second memory, and a second storage device, and be configured to make, in response to the request, a second determination that the remaining sideline token is available; and send, based on the second determination, the remaining sideline token to the network device.

DETAILED DESCRIPTION

Figure 1:
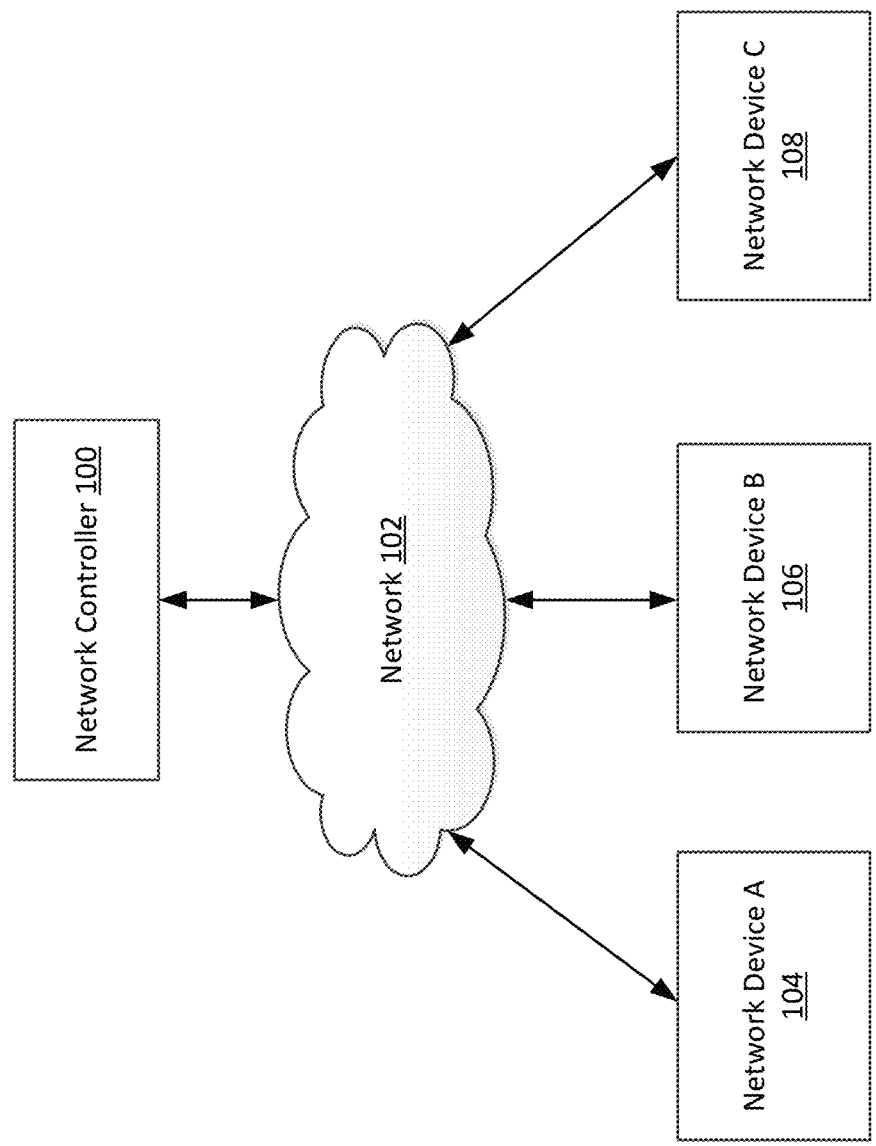
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to sidelining (i.e., removing from service, at least temporarily) a network device that experiences a problem. Specifically, in one or more embodiments of the invention, a network device monitors its state. The network device may determine that the state of the device has degraded in some way. For example, the network device may monitor one or more counters counting dropped network data units (e.g., Internet Protocol (IP) packets) and, when a threshold number of packets, or a threshold ratio of dropped to forwarded packets, has been reached or breached, the state of the network device may be considered degraded. In one or more embodiments of the invention, once the network device determines that its state has become degraded, the network device sends a request to a network controller for a sideline token.

In one or more embodiments of the invention, the network controller has a set of sideline tokens for one or more groups (e.g., pools) of network devices. Once a request is received from a network device in such a group, the network controller determines whether there are any remaining sideline tokens for the group. If there are no sideline tokens left for the group (i.e., all sideline tokens for the group have already been sent to other network devices in the group), then no sideline token is sent to the device, and the network controller takes one or more additional actions, such as alerting a network administrator that the sideline token pool has no remaining tokens, which may indicate a more serious problem with the network. If, on the other hand, one or more sideline tokens are available for the group, then the network controller sends a sideline token to the requesting network device.

In one or more embodiments of the invention, receipt of a sideline token from the network controller confirms for the network device that it may be sidelined. In one or more embodiments of the invention, sidelining occurs by the network device initiating a graceful offlining procedure. A network device may return to service once the condition causing the degraded state is remedied or based on intervention by a user.

FIG. 1 shows a system in accordance with one or more embodiments of the invention. As shown in FIG. 1, the system includes a network controller (100) and one or more network devices (e.g., network device A (104), network device B (106), network device C (108)). The network devices (104, 106, 108) may be connected to the network controller (100) via a network (102). Each of these components is described below.

In one or more embodiments of the invention, a network controller (100) is a computing device. In one or more embodiments of the invention, a computing device is any device or any set of devices capable of electronically processing instructions and that includes, at least, one or more processors, memory, input and output device(s), and operative network connectivity to one or more network devices (e.g., 104, 106, 108). Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer and/or any other mobile computing device), a network device (e.g., switch, router, multi-layer switch, etc.) and/or any other type of computing device with the aforementioned requirements. As an example, a network controller (100) may be implemented as an specialized operating system running on a VM that communicates with a set of clients, which may be agents executing on a set of network devices (e.g., 104, 106, 108).

In one or more embodiments of the invention, a network controller (100) includes functionality to manage and monitor various aspects of a network and network devices therein. Examples of management and/or monitoring functionality include, but are not limited to, discovering a physical network topology, monitoring the state of the network devices in a network (e.g., using various telemetry tools), management of implementations of various network protocols (e.g., Virtual eXtensible Local Area Network (VXLAN), Open vSwitch Database (OVCSB), etc.), facilitating the sharing of state information between network devices (which may be physical or virtual devices), network segmentation services, traffic monitoring services, inventory management, software version management services, authentication and authorization services, user account management services, etc.

In one or more embodiments of the invention, a network controller (100) is operatively connected to a set of network devices which, at least in part, the network controller manages and monitors. As such, a network controller (100) may be indirectly connected to the network devices (104, 106, 108) (as shown in FIG. 1), directly connected to network devices (104, 106, 108) (not shown), or any combination thereof.

In one or more embodiments of the invention, a network controller (100) includes any number of sideline tokens (not shown). In one or more embodiments of the invention, a sideline token is any type of information unit that may be transmitted to a network device (104, 106, 108) in order to communicate to the network device to begin a graceful offlining process (i.e., sidelining the device). A sideline token may include information identifying the receiving network device, the sending network controller, and/or any other information. In one or more embodiments of the invention, the network controller (100) has different pools of sideline tokens, with each pool having a specific quantity of sideline tokens and being associated with a different set of network devices. For example, if the network devices are arranged in a spine-leaf topology (not shown) (discussed further below), the network controller may have a first pool of sideline tokens for the network devices in the spine layer, a second pool of tokens for the network devices in the leaf layer, and a third pool of tokens associated with certain devices (e.g., wide area network (WAN) devices) that are connected to the leaf devices.

In one or more embodiments of the invention, a network controller (100) includes functionality to receive requests from network devices for sideline tokens, determine if any sideline tokens from the appropriate pool are remaining, and, if so, send a remaining sideline token to the requesting network device. In one or more embodiments of the invention, the quantity of sideline tokens in a given pool may be based on the level of redundancy of network devices in the pool, and may be automatically set or may be configurable. The quantity may be a percentage of network devices in the pool, a specific number, etc. A sideline token may be communicated to a network device using any communication scheme. For example, the sideline token may be sent as part of an IP packet.

In one or more embodiments of the invention, a network (102) may be an entire network or any portion thereof. A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet. Although FIG. 1 shows the network controller (100) and network devices (104, 106, 108) separate from and connected to/by the network (102), one having ordinary skill in the art, and the benefit of this Detailed Description, will appreciate that any or all of the network controller (100) and network devices (104, 106, 108) may be considered part of the network (102), and may represent all or any portion of the network.

In one or more embodiments of the invention, a network (102), and any devices therein (e.g., 100, 104, 106, 108, etc.), may be arranged in any network topology. In one or more embodiments of the invention, a network topology is an arrangement of various elements of a network.

For example, a network topology may be a bipartite network topology. In one or more embodiments of the invention, a bipartite network topology is a network topology in which there are at least two sets of network devices (not shown), with connections between devices of one set and devices of another set, but no connections between devices within a given set. Examples of such network topologies include, but are not limited to, a folded three-stage Clos network topology (e.g., a spine-leaf network topology), a fat tree topology (i.e., Leiserson topology), etc. In one or more embodiments of the invention, a network topology may include network devices that are highly interconnected, with, as an example, each device in a first set of network devices being connected to each device in a second set of network devices within the network topology. In one or more embodiments of the invention, when a network topology is arranged as a spine-leaf topology, the network topology includes a leaf layer (not shown), a spine layer (not shown), and any number of other devices (not shown) (e.g., wireless access points) that are connected to one or more network devices in the leaf layer.

In one or more embodiments of the invention, a network device (104, 106, 108) may be a physical device that includes and/or is operatively connected to persistent storage (not shown), memory (e.g., random access memory (RAM)) (not shown), one or more processor(s) (e.g., integrated circuits) (not shown), and two or more physical network interfaces (which may also be referred to as ports). In one or more embodiments of the invention, the one or more processors of a network device (e.g., a central processing unit) are separate components from a network chip, one or more of which may also be components of a network device (104, 106, 108).

In one or more embodiments of the invention, a network device (104, 106, 108) also includes any number of network chips (not shown). In one or more embodiments of the invention, a network chip is any hardware (e.g., circuitry), software, firmware, and/or combination thereof that includes functionality to receive, process, and/or transmit network traffic data units (e.g., IP packets, Media Access Control (MAC) frames, etc.) in accordance with one or more embodiments of the invention. In order to perform such functionality, a network chip may include any number of components. Such components may include, but are not limited to, one or more processors, one or more buffers (e.g., for implementing receive and/or transmit queues, such as virtual output queues (VOQs)), any type or amount of non-volatile storage, and/or any type or amount of volatile storage (e.g., RAM). A network chip may also include and/or be operatively connected to any number of physical network interfaces of a network device (104, 106, 108). Such interfaces may provide a path external to the network device (104, 106, 108) (e.g., to other devices), and/or may be operatively connected to other components internal to the network device (104, 106, 108), and each such interface may be an ingress and/or egress interface.

In one or more embodiments of the invention, a network device (104, 106, 108) includes functionality to receive network traffic data units at any of the physical network interfaces (i.e., ports) of the network device and to process the network traffic data units to determine whether to: (i) drop the network traffic data unit; (ii) process the network traffic data unit; and/or (iii) transmit the network traffic data unit, based on the processing, from a physical network interface or port on the network device in accordance with one or more embodiments of the invention.

As a non-limiting example, a network chip may be hardware that receives network traffic data units at an ingress port, and determines out of which egress port on the network device (104, 106, 108) to forward the network traffic data units such as, for example, media access control (MAC) frames that may include Internet Protocol (IP) packets.

In one or more embodiments of the invention, a network device (104, 106, 108) includes functionality to store (e.g., in persistent storage, in memory, etc.), any number of data structures (e.g., routing information base (RIB), forwarding information base (FIB), link state database, counters, etc.) for facilitating operation of at least some aspects of the network device. Such structures may be stored in a data repository (not shown) included in and/or operatively connected to the network device (104, 106, 108). In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device (104, 106, 108) as described above.

In one or more embodiments of the invention, a network device (104, 106, 108) includes one or more agents (not shown), which interact with the network controller (100) to facilitate the exchange of information between the network controller and the network device. For example, an agent may monitor any number of counters that record packet loss, and may make a determination, based on packet loss, or based on a ratio of dropped packets to forwarded packets, breaching (e.g., exceeding) a threshold, to request a sideline token from a network controller (100).

Examples of a network device (104, 106, 108) include, but are not limited to, a network switch, a router, a multi-layer switch, a fibre channel device, an InfiniBand® device, etc. A network device is not limited to the aforementioned examples.

In one or more embodiments of the invention, a network device (104, 106, 108) and/or a network controller (100) also include software and/or firmware stored in any data repository (not shown) and/or memory (not shown) (i.e., non-transitory computer readable mediums). Such software and/or firmware may include instructions which, when executed by the one or more processors (not shown) of the network device (104, 106, 108) or network controller (100), cause the one or more processors to perform operations in accordance with one or more embodiments of the invention. The instructions may be in the form of computer readable program code to perform embodiments of the invention, and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention. The functionality of a network device (104, 106, 108) or network controller (100) is not limited to the aforementioned examples.

While FIG. 1 shows a configuration of components, other configurations may be used without departing from the scope of the invention. For example, the network topology may be any network topology other than the arrangement shown in FIG. 1. As another example, the quantity of network devices managed and monitored by the network controller may be less (or more) than the quantity of network devices shown in FIG. 1. Accordingly, embodiments disclosed herein should not be limited to the configuration of components shown in FIG. 1.

Figure 2:
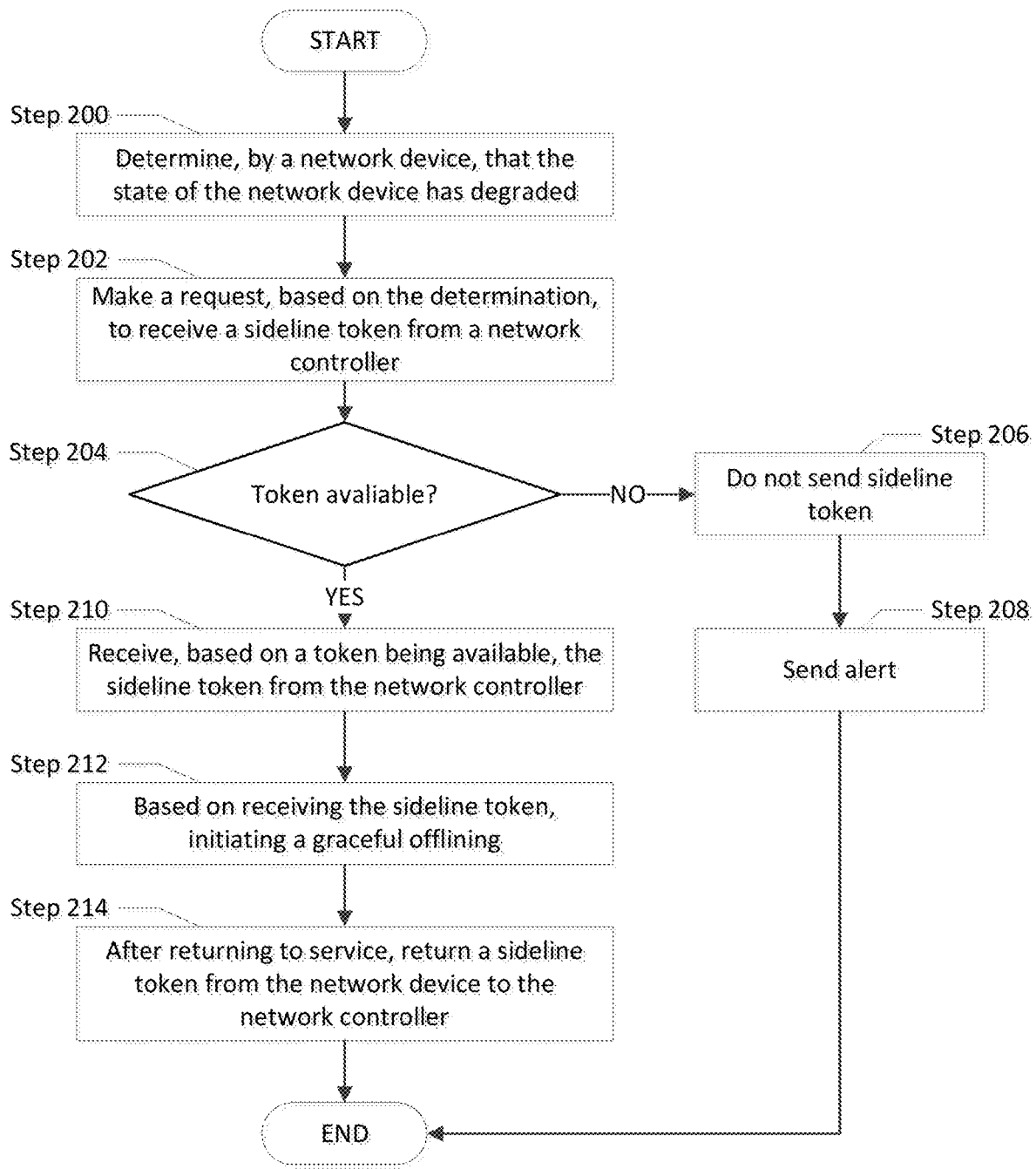
FIG. 2 shows a flowchart in accordance with one or more embodiments of the invention.

FIG. 2 shows a flowchart describing a method for sidelining a network device in accordance with one or more embodiments of the invention. One or more steps shown in FIG. 2 may be omitted or repeated, and any steps may be performed in any different order among different embodiments of the invention.

In Step 200, a network device makes a determination that the state of the network device has degraded. The state of a network device being degraded may refer to any problem being identified for any component of the network device, any reduction in the performance of a network device, or any measured metric falling below or rising above any threshold.

For example, a network device may have one or more counters that monitor network traffic to determine if any packets are being dropped anywhere in the network device. In such an example, the state of the network device may be considered degraded if any such counter, or the aggregate total of all such counters or any portion thereof, indicate that the number of dropped packets has exceeded a threshold. Such a threshold may be a number, a percentage, etc., and may be measured with respect to a given period of time. Some counters come in pairs to count packets correctly forwarded and packets dropped for a given block or chip in the system, which may allow for computation of a ratio of dropped packets to forwarded packets over a given period of time. The ratio of dropped to forwarded packets can also be used as a threshold to detect a device that the device has degraded. Such thresholds may be pre-programmed, updated, user configurable, etc.

Other examples of state degradation include, but are not limited to, a temperature threshold for the network device or any component(s) therein being exceeded, power consumption going above a power threshold, etc.

In one or more embodiments of the invention, the state of the network device is monitored by an agent executing on one or more processors of the network device, which makes a determination as to when the state has become degraded. In one or more embodiments of the invention, the network device (or agent) sends an alert that the state has degraded to a network administrator.

In Step 202, the network device (or an agent executing thereon), based on the determination in Step 200 that the state has degraded, makes a request to a network controller for a sideline token. For example, an agent executing on the network device may determine that a set of counters on the network device counting dropped packets for a given time period has reached an aggregate number of dropped packets that is greater than a configured threshold. Based on this determination, the agent may send a request for a sideline token to the network controller. The request may be sent using any communication scheme. For example, the request may be communicated as part of an IP packet within a MAC frame.

In Step 204, in response to the request made in Step 202, the network controller makes a determination as to whether any sideline tokens are available to send to the requesting network device. In one or more embodiments of the invention, the network controller has more than one pool of sideline tokens, with each pool being associated with a set of network devices. In such embodiments, the network controller first determines to which pool the requesting network device belongs, and then checks if any sideline tokens remain for that pool. If no tokens are available to send to the network device, the process proceeds to Step 206. If there is at least one token remaining, the process proceeds to Step 210.

In Step 206, based on a determination that no sideline tokens remain to send to the requesting network device, no sideline token is sent to the network device. In Step 208, the network controller sends an alert to a network administrator that all of the sideline tokens, or all sideline tokens in a given pool, have been distributed, and that an additional network device is requesting a sideline token. Such a scenario may suggest that the network as a whole is experiencing problems, as the number of tokens may represent the total number of network devices that can be sidelined simultaneously without experiencing significant network performance degradation and/or loss of redundancy. In one or more embodiments of the invention, the network controller may also put the request from the network device into a queue, which may allow the network controller to send the network device a sideline token in the event that one becomes available. In one or more embodiments of the invention, if the network controller receives two or more sideline token requests within a given timeframe, the network controller may include a priority order of network devices (or of devices within a given pool), and may send sideline tokens to the network devices based on the priority order. In one or more embodiments of the invention, the priority order is determined by the amount of drop or by the drop ratio of the requesting networking devices.

In Step 210, based on a determination that at least one sideline token remains for the network devices or pool of network devices, the network controller sends, and the network device receives, a sideline token. The sideline token may be communicated from the network controller to the network device using any communication scheme. For example, in embodiments of the invention in which the network controller is implemented on a VM, the sideline token may be sent as an IP packet from the VM to a virtual switch, then from the virtual switch to a physical switch, and then, using a combination of bridging and routing, to the requesting network device.

In Step 212, based on receiving the sideline token, the network device initiates a graceful offlining. In one or more embodiments of the invention, a graceful offlining includes performing one or more actions that cause other network devices to stop sending network traffic data units to the network device performing the graceful offlining. For example, the network device may implement a Border Gateway Protocol (BGP) (or any other routing protocol) to send and receive routes to implement in a FIB and/or RIB. In such an example, the network device may begin advertising itself as having more expensive routes, which will cause other network devices to choose to use routes that do not include the network device in order to transmit packets by, from the perspective of the network device, the shortest path. In a period of time, such actions may cause the network device to cease receiving any network traffic data units (or at least a reduced number of packets), thereby allowing the network to drop fewer network traffic data units.

In one or more embodiments of the invention, once the network device ceases receiving network traffic data units, or at least most network traffic data units, or after a predetermined or configured period of time, the network device may remove itself from service. In one or more embodiments of the invention, removing a network device from service may include shutting down the network device, or any portion thereof (e.g., ports). In one or more embodiments of the invention, removing a network device from service may include putting the network device in a maintenance mode. In one or more embodiments of the invention, a maintenance mode is an operational state where the network device remains powered on, but does not process network traffic.

In Step 214, after the network device returns to service, the network device returns a sideline token to the network controller, thereby allowing the network controller to service an additional request for a sideline token. In one or more embodiments of the invention, the network device returns to service after the cause of its state degradation has been remedied. Such a remedy may merely require that the network device be restarted, or may require that some action is taken to fix the problem, such as a software update for all or some portion of the network device. In one or more embodiments of the invention, rather than a network device returning a sideline token to the network controller, the sideline tokens of a network controller or for any pool regenerate over time. Such token regeneration may be configurable. As an example, a network administrator may configure the rate of token regeneration. Such a rate may have a default value of zero tokens per day, and may, for example, be changed by the network administrator to 3 tokens per day based on empirical information gathered regarding the performance of the network and/or network devices. In one or more embodiments of the invention, rather than a network device returning a sideline token to the network controller, or regenerating over time, the network controller may have to have the number of sideline tokens manually reset by a network administrator.

Figure 3:
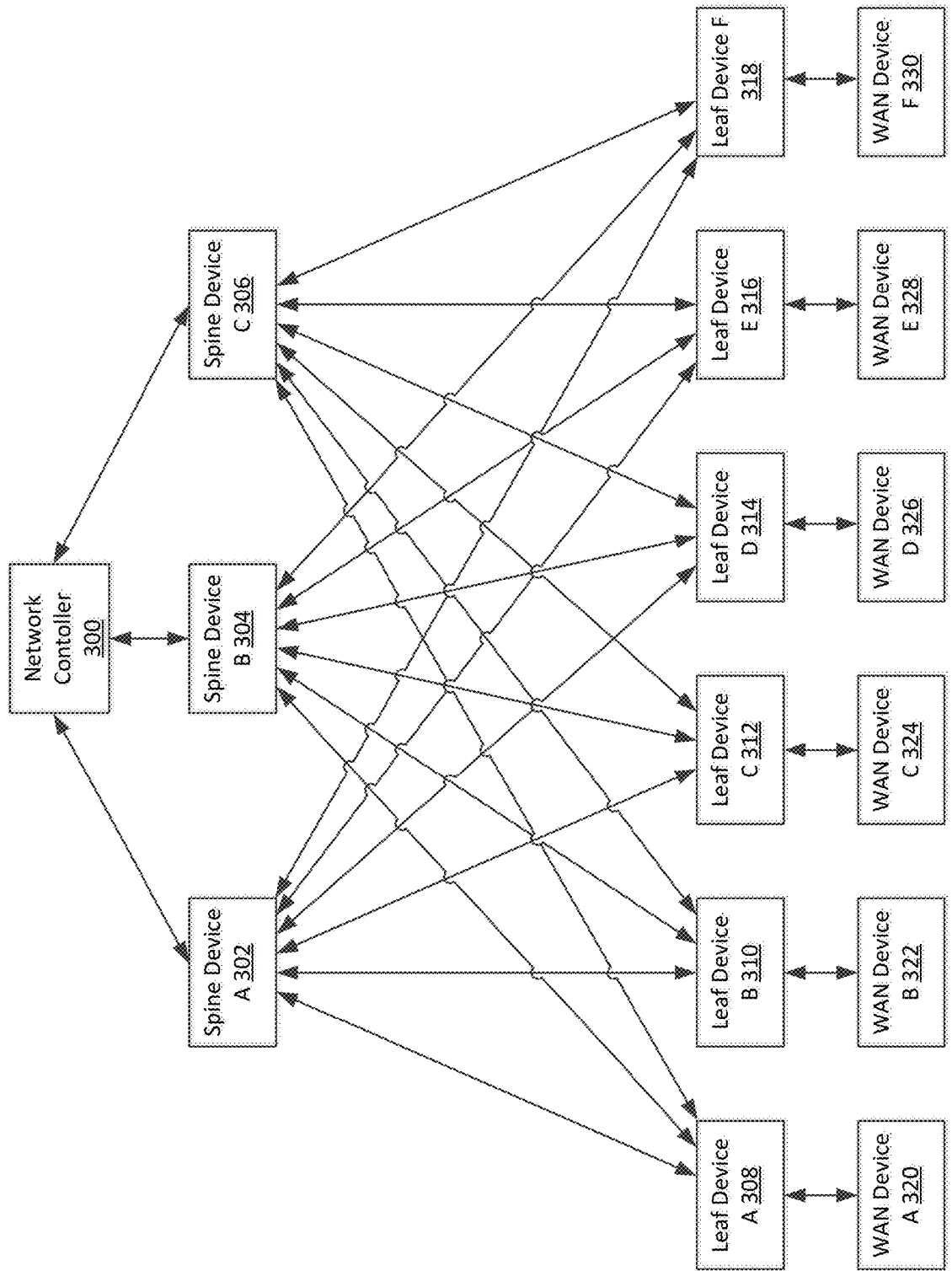
FIG. 3 shows an example in accordance with one or more embodiments of the invention.

FIG. 3 shows an example in accordance with one or more embodiments of the invention. The following example is for explanatory purposes only and not intended to limit the scope of the invention.

Referring to FIG. 3, consider a scenario in which a spine-leaf network topology has been implemented. In such a scenario, a network controller (300) is operatively connected to spine device A (302), spine device B (304), and spine device C (306). Each spine device (302, 304, 306) is operatively connected to each of leaf device A (308), leaf device B (310), leaf device C (312), leaf device D (314), leaf device E (316), and leaf device F (318). Leaf device A (308) is operatively connected to WAN device A (320). Leaf device B (310) is operatively connected to WAN device B (322). Leaf device C (312) is operatively connected to WAN device C (324). Leaf device D (314) is operatively connected to WAN device D (326). Leaf device E (316) is operatively connected to WAN device E (328). Leaf device F (318) is operatively connected to WAN device F (330).

As shown in FIG. 3, the spine devices (302, 304, 306) are directly connected to the network controller, while the other devices (308-330) are indirectly connected to the network controller.

The network controller includes three pools of sideline tokens (not shown). The first pool is associated with the spine devices (302, 304, 306). The second pool is associated with the leaf devices (308-318). The third pool is associated with the WAN devices (320-330).

The spine device pool includes two sideline tokens because if two of the three redundant spine devices go offline, the third one has connections sufficient to service the network. However, if two of the spine devices go offline, the network has lost redundancy in the spine layer.

The leaf device pool includes four sideline tokens because, based on expected network load, a determination has been made that the network can handle a simultaneous loss of up to four leaf devices and still continue to operate as expected.

The WAN device pool includes three sideline tokens because, based on expected network load, a determination has been made that the network can handle a simultaneous loss of up to three WAN devices and still continue to operate as expected.

In this scenario, spine device A (302) includes an agent (not shown) that is monitoring a variety of counters, each of which is counting a number of dropped packets. When the agent determines that, for a given period of time, 10% or more of the packets sent to the spine device A (302) have been dropped, spine device A (302) sends a request for a sideline token to the network controller.

The network controller (300) checks its spine device pool, and determines that two sideline tokens remain. Based on this determination, the network controller (300) sends a sideline token to spine device A (302). Upon receipt of the sideline token, spine device A (302) initiates a graceful offlining by advertising its routes as being more expensive. Once spine device A (302) stops receiving network traffic, spine device A (302) then takes the steps necessary to enter maintenance mode, and sends an alert to a network administrator that such steps have been taken.

Sometime later, but before spine device A (302) exits maintenance mode, spine device B (304) also experiences dropped packets in excess of a configured threshold. Therefore, spine device B (304) sends a request for a sideline token to the network controller.

The network controller (300) checks its spine device pool, and determines that one sideline token remains. Based on this determination, the network controller (300) sends a sideline token to spine device B (304). Upon receipt of the sideline token, spine device B (304) initiates a graceful offlining by advertising its routes as being more expensive. Once spine device B (304) stops receiving network traffic, spine device B (304) then takes the steps necessary to enter maintenance mode, and sends an alert to a network administrator that such steps have been taken.

Sometime later, but before spine device A (302) and spine device B exit maintenance mode, spine device C (306) also experiences dropped packets in excess of a configured threshold. Therefore, spine device C (306) sends a request for a sideline token to the network controller.

The network controller (300) checks its spine device pool, and determines that zero sideline token remains. Based on this determination, the network controller (300) does not send a sideline token to spine device C (306), and instead sends an alert to a network administrator (not shown) that all sideline tokens in the spine device pool have been sent to spine devices A and B (302, 304), and that spine device C has requested but not received a sideline token. The request from spine device C (306) is placed into a queue.

In response to receiving the alert, the network administrator takes immediate action. First, in this example, the network administrator examines spine device A (302) and determines that spine device A has had an automatic software update that caused a misalignment of software versions between components within the device. Therefore, the network administrator applies to spine device A (302) necessary software updates to realign the software versions.

Once spine device A (302) is finished being updated, spine device A exits maintenance mode and returns to service. Once spine device A (302) has returned to service, it returns a sideline token to the network controller (300). Upon receipt of the sideline token from spine device A (302), the network controller (300) checks its spine device request queue and finds the sideline token request from spine device C (306). Accordingly, the network controller (300) sends a sideline token to spine device C (306).

Upon receipt of the sideline token, spine device C (306) initiates a graceful offlining by advertising its routes as being more expensive. Once spine device C (306) stops receiving network traffic, spine device C (306) then takes the steps necessary to enter maintenance mode, and sends an alert to a network administrator that such steps have been taken.

Next, the network administrator checks spine device B (304) and determines that a linecard in spine device B (304) has stopped functioning, meaning all traffic received at interfaces coupled to the line card was being dropped. Therefore, the network administrator powers down spine device B (304) and replaces the faulty linecard.

Once spine device B (304) has the new linecard installed and restarts, spine device B (304) returns to service. Once spine device B (304) has returned to service, it returns a sideline token to the network controller (300). Because there are no queued requests from a spine device for a sideline token, the total remaining sideline tokens in the spine device pool is now one.

Next, the network administrator checks spine device C (306) and determines that an out of date network device operating system with a known issue was what caused the packet drops. Therefore, the network administrator updates the operating system of spine device C (306).

Once spine device C (306) is has the new operating system installed, it exits maintenance mode and returns to service. Once spine device C (306) has returned to service, it returns a sideline token to the network controller (300). Because there are no queued requests from a spine device for a sideline token, the total remaining sideline tokens in the spine device pool is now two, and the network is back to being fully operational and redundant.

One having ordinary skill in the art, and the benefit of this Detailed Description, will appreciate that though the above example uses spine devices and sideline tokens from the spine device pool of the network controller, similar series of events may occur at the leaf layer and/or the WAN layer of the network topology.

Embodiments of the invention described above allow for network devices to self-monitor, and when a degraded state is detected, automatically request a sideline token from a network administrator, and automatically sideline themselves so that remedial action may be taken to correct whatever problem has arisen. Additionally, the sideline token scheme allows a network controller to proactively alert a network administrator when the network, as a whole, is becoming potentially degraded and/or has lost at least a portion of its redundancy.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for sidelining, the method comprising:
    making a first determination, by a first network device, that a first network device state has degraded;
    making a first request, based on the first determination, to receive a first sideline token from a network controller, wherein the network controller, in response to the first request, makes a second determination that a remaining sideline token is available;
    receiving, by the first network device and based on the second determination, the remaining sideline token from the network controller; and
    initiating, by the first network device, a graceful offlining based on receiving the remaining sideline token.

2. The method of claim 1, further comprising:
    making a third determination, by a second network device, that a second network device state has degraded;
    making a second request, based on the third determination, to receive a second sideline token from the network controller, wherein the network controller makes a fourth determination that there is no remaining sideline token available; and
    sending, based on the fourth determination, an alert to a network administrator.

3. The method of claim 2, wherein the first network device and the second network device are both in a layer of a network topology, and the network controller comprises a pool of sideline tokens associated with the layer.

4. The method of claim 1, wherein initiating the graceful offlining comprises advertising a plurality of routes as more expensive routes.

5. The method of claim 4, further comprising, after the first network device stops receiving at least a portion of network traffic, entering a maintenance mode.

6. The method of claim 5, further comprising exiting the maintenance mode after a condition causing the degradation of the first network device state is remedied.

7. The method of claim 6, further comprising, after exiting the maintenance mode, returning the remaining sideline token to the network controller.

8. The method of claim 1, wherein making the first determination that the first network device state has degraded comprises detecting, by an agent executing on the first network device, that the first network device has experienced a plurality of network traffic data unit drops in excess of a network traffic data unit drop threshold.

9. The method of claim 1, wherein making the first determination that the first network device state has degraded comprises detecting, by the network device that a threshold ratio of dropped network data traffic units to forwarded network data traffic units is breached.

10. The method of claim 1, further comprising regenerating, by the network controller, sideline tokens at a configured rate.

11. The method of claim 1, wherein, after sending the remaining sideline token, a manual reset request is received at the network device.

12. A non-transitory computer readable medium comprising instructions that, when executed by a processor, perform a method for sidelining, the method comprising:
    making a first determination, by a first network device, that a first network device state has degraded;
    making a first request, based on the first determination, to receive a first sideline token from a network controller, wherein the network controller, in response to the first request, makes a second determination that a remaining sideline token is available;

receiving, by the first network device and based on the second determination, the remaining sideline token from the network controller; and initiating, by the first network device, a graceful offlining based on receiving the remaining sideline token.

13. The non-transitory computer readable medium of claim 12, wherein the method performed by the instructions further comprises:

making a third determination, by a second network device, that a second network device state has degraded;

making a second request, based on the third determination, to receive a second sideline token from a network controller, wherein the network controller makes a fourth determination that there is no remaining sideline token available; and sending, based on the fourth determination, an alert to a network administrator.

14. The non-transitory computer readable medium of claim 13, wherein the first network device and the second network device are both in a layer of a network topology, and the network controller comprises a pool of sideline tokens associated with the layer.

15. The non-transitory computer readable medium of claim 12, wherein initiating the graceful offlining comprises advertising a plurality of routes as more expensive routes.

16. The non-transitory computer readable medium of claim 15, wherein the method performed by the instructions further comprises, after the first network device stops receiving at least a portion of network traffic, entering a maintenance mode.

17. The non-transitory computer readable medium of claim 16, wherein the method performed by the instructions further comprises, further comprising exiting the maintenance mode after a condition causing the degradation of the first network device state is remedied.

18. The non-transitory computer readable medium of claim 17, wherein the method performed by the instructions further comprises, after exiting the maintenance mode, returning the remaining sideline token to the network controller.

19. The non-transitory computer readable medium of claim 12, wherein making the first determination that the first network device state has degraded comprises detecting, by an agent executing on the first network device, that the first network device has experienced a plurality of network traffic data unit drops in excess of a network traffic data unit drop threshold.

20. The non-transitory computer readable medium of claim 12, wherein making the first determination that the first network device state has degraded comprises detecting, by the first network device, that a threshold ratio of dropped network data traffic units to forwarded network data traffic units is breached.

21. The non-transitory computer readable medium of claim 12, wherein the method performed by the instructions further comprises regenerating, by the network controller, sideline tokens at a configured rate.

22. A system for sidelining, the system comprising:

a network device comprising a first processor, a first memory, and a first storage device, and configured to:

make a first determination that a first network device state has degraded;

make a request, based on the first determination, to receive a first sideline token from a network controller;

receive a remaining sideline token from the network controller; and initiate a graceful offlining based on receiving the remaining sideline token; and the network controller comprising a second processor, a second memory, and a second storage device, and configured to:

make, in response to the request, a second determination that the remaining sideline token is available; and send, based on the second determination, the remaining sideline token to the network device.

* * * * *